(12) United States Patent
Mehta et al.

(10) Patent No.: US 11,695,744 B2
(45) Date of Patent: Jul. 4, 2023

(54) USING CREDENTIALS STORED IN DIFFERENT DIRECTORIES TO ACCESS A COMMON ENDPOINT

(71) Applicant: Amazon Technologies, Inc., Seattle, WA (US)

(72) Inventors: Gaurang Pankaj Mehta, Seattle, WA (US); Neelam Satish Agrawal, Seattle, WA (US); Lawrence Hun-Gi Aung, Seattle, WA (US); Chirag Pravin Pandya, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 16/987,877

(22) Filed: Aug. 7, 2020

(65) Prior Publication Data

US 2020/0366661 A1    Nov. 19, 2020

Related U.S. Application Data

(63) Continuation of application No. 15/583,715, filed on May 1, 2017, now Pat. No. 10,757,086, which is a
(Continued)

(51) Int. Cl.
*H04L 9/40* (2022.01)
*H04L 67/10* (2022.01)
(Continued)

(52) U.S. Cl.
CPC .............. *H04L 63/08* (2013.01); *G06F 21/31* (2013.01); *H04L 61/45* (2022.05);
(Continued)

(58) Field of Classification Search
CPC ...... G06F 21/31; H04L 61/45; H04L 61/4511; H04L 61/4523; H04L 61/4552;
(Continued)

(56) References Cited

U.S. PATENT DOCUMENTS 6,138,159 A * 10/2000 Phaal ................. G06F 16/9566
707/E17.115
6,505,238 B1   1/2003 Tran
(Continued)

FOREIGN PATENT DOCUMENTS

CN    101247367    3/2011
CN    103460215    10/2016
(Continued)

OTHER PUBLICATIONS

International Search Report for International Application No. PCT/US2015/052827 dated Dec. 21, 2015 (12 pages).
(Continued)

*Primary Examiner* — Theodore C Parsons
(74) *Attorney, Agent, or Firm* — Knobbe Martens Olson & Bear LLP

(57) ABSTRACT

A global endpoint may be associated with an organization name and a plurality of directories located in different geographic regions. The global endpoint may be a computing system that hosts a page used by users to access an application or service. A user may be able to access the application or service using already existing credentials. For example, the user may access the application or service using credentials stored and maintained by an entity with which the user is affiliated. Users having credentials stored in different geographic regions may be able to access the application or service via the same global endpoint.

20 Claims, 7 Drawing Sheets

Related U.S. Application Data continuation of application No. 14/506,342, filed on Oct. 3, 2014, now Pat. No. 9,641,503.

(51) Int. Cl.
*H04L 67/1021* (2022.01)
*G06F 21/31* (2013.01)
*H04L 61/45* (2022.01)
*H04L 61/4523* (2022.01)
*H04L 61/4552* (2022.01)
*H04L 67/51* (2022.01)
*H04L 67/52* (2022.01)
*H04L 67/1001* (2022.01)
*H04L 61/4511* (2022.01)

(52) U.S. Cl.
CPC ...... *H04L 61/4523* (2022.05); *H04L 61/4552* (2022.05); *H04L 63/083* (2013.01); *H04L 63/0815* (2013.01); *H04L 63/107* (2013.01); *H04L 67/10* (2013.01); *H04L 67/1001* (2022.05); *H04L 67/1021* (2013.01); *H04L 67/51* (2022.05); *H04L 67/52* (2022.05); *H04L 61/4511* (2022.05)

(58) Field of Classification Search
CPC ... H04L 63/08; H04L 63/0815; H04L 63/083; H04L 63/107; H04L 67/10; H04L 67/1001; H04L 67/1021; H04L 67/51; H04L 67/52
See application file for complete search history.

(56) References Cited

U.S. PATENT DOCUMENTS

| | | |
|---|---|---|
| 7,308,709 B1 | 12/2007 | Brezak, Jr. et al. |
| 7,925,782 B2 | 4/2011 | Sivasubramanian et al. |
| 2002/0143943 A1* | 10/2002 | Lee ................ H04L 67/306 709/225 |
| 2003/0163730 A1 | 8/2003 | Roskind |
| 2004/0098615 A1 | 5/2004 | Mower et al. |
| 2004/0218747 A1 | 11/2004 | Ranalli et al. |
| 2006/0059564 A1* | 3/2006 | Tan ................ H04L 63/105 726/27 |
| 2007/0233291 A1* | 10/2007 | Herde ............. G06Q 10/10 700/91 |
| 2008/0098460 A1 | 4/2008 | Jain |
| 2009/0007241 A1 | 1/2009 | Tewari et al. |
| 2009/0077618 A1 | 3/2009 | Pearce et al. |
| 2011/0314520 A1 | 12/2011 | Olszewski et al. |
| 2012/0240183 A1 | 9/2012 | Sinha |
| 2013/0061306 A1 | 3/2013 | Sinn |
| 2013/0254269 A1 | 9/2013 | Sivasubramanian et al. |
| 2013/0254847 A1 | 9/2013 | Adams et al. |
| 2014/0156684 A1 | 6/2014 | Zaslavsky |
| 2015/0135257 A1 | 5/2015 | Shah et al. |

FOREIGN PATENT DOCUMENTS

| | | |
|---|---|---|
| CN | 103516718 | 1/2019 |
| JP | 2001-188758 A | 7/2001 |
| JP | 2005-122656 A | 5/2005 |
| JP | 2008-543132 A | 11/2008 |
| JP | 2010-193015 A | 9/2010 |
| JP | 2011-076506 A | 4/2011 |
| JP | 2012-212211 A | 11/2012 |
| JP | 2013-033449 A | 2/2013 |

OTHER PUBLICATIONS

Andrew Findlay, LDAP Schema Design, retrieved Aug. 2019 from https://www.skills-1st.co.uk/papers/ldap-schema-design-feb-2005/ldap-schema-design-feb-2005.pdf (Feb. 2005) (Year: 2005).

* cited by examiner

USING CREDENTIALS STORED IN DIFFERENT DIRECTORIES TO ACCESS A COMMON ENDPOINT

CROSS REFERENCE TO RELATED APPLICATIONS

This application is a continuation of U.S. patent application Ser. No. 15/583,715, entitled "USING CREDENTIALS STORED IN DIFFERENT DIRECTORIES TO ACCESS A COMMON ENDPOINT" and filed on May 1, 2017, which is a continuation of U.S. patent application Ser. No. 14/506,342, entitled "USING CREDENTIALS STORED IN DIFFERENT DIRECTORIES TO ACCESS A COMMON ENDPOINT" and filed on Oct. 3, 2014, issued as U.S. Pat. No. 9,641,503, each of which is hereby incorporated by reference herein in its entirety.

BACKGROUND

Administrators frequently utilize directory services to create and maintain a directory for user and/or computing resource management and/or for providing access to a variety of computing resources (e.g., file systems, files, users, security policies, network resources, applications, system storage, etc.). The directory service may be implemented in a data server operated by an administrator (e.g., on-premises). The administrator may also manage a plurality of client devices operated by users, each of which shares a network or domain with the data server. To keep client devices secure and to ensure compatibility across the domain, the data server may assign and enforce security policies on the client devices and install or update software running on the client devices.

However, installing, maintaining, and operating the data server can be burdensome. The data server itself may include several computing systems, thus requiring the purchase of expensive hardware and the configuring of complex software. In some cases, dedicated facilities for powering and cooling the data server may be needed as well. Establishing and maintaining connectivity between the data server and the client devices may require the installation of expensive network equipment. Furthermore, additional hardware and/or software may be needed to implement backup and recovery procedures in case the data server fails or data is otherwise lost.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction—Global Endpoint with an Organizational Name

Figure 1A:
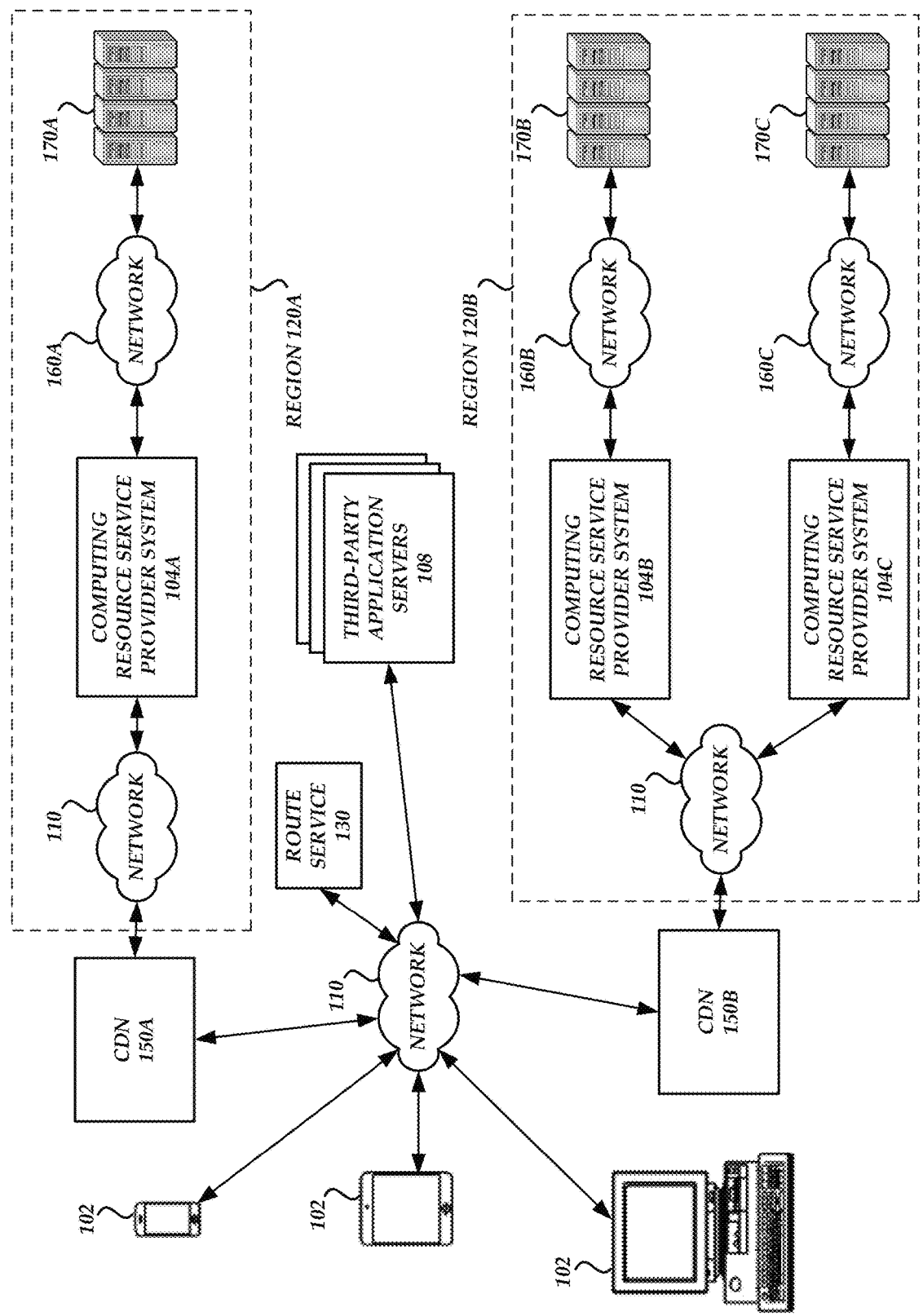
FIG. 1A illustrates a managed directory service environment with various regions that provide directory services according to one embodiment

As described above, on-premises data servers that implement directory services can be burdensome. Thus, in some conventional systems, a managed directory service (e.g., a system that stores, organizes, and provides access to information in a computer operating system's directory, such as MICROSOFT® ACTIVE DIRECTORY®) can be implemented by a centrally-managed data server that is located remotely and shared by a plurality of administrators and/or organizations. The managed directory service may manage a plurality of directories. The centrally-managed data server may provide access to the managed directory service via a network (e.g., the Internet) and an administrator may use existing network-enabled client devices to manage the directory. For example, the administrator may establish an account with the entity providing the centrally-managed data server. When accessing the account, the administrator can create one or more directories, create a domain (e.g., a computer network in which all user accounts and computing resources, such as computers, printers, scanners, services, processes, threads, etc., are registered with a single directory service) within a directory, and add member servers (e.g., a server that implements lightweight directory access protocol (LDAP), Kerberos, a domain name system (DNS) service, or other Active Directory tools to manage records in a directory) to the domain. Using a member server added to the domain, the administrator can create and manage domain users. Accordingly, the administrator can implement a directory service without having to install or maintain the infrastructure normally used to implement the directory service.

Existing managed directory services have several limitations. For example, two or more entities may have created directories using a managed directory service. Because the entities are separate and created separate directories, the users may be authenticated by accessing their respective entity's directory. In some cases, the entities may desire to share resources or content. One possible way that the entities could share resources or content would be to create a shared organization that serves as a common endpoint accessible by users associated with either entity. However, because the entities maintain different directories, the users of one entity may not be able to use their existing credentials to access the directory created by another entity unless new user accounts are created, and vice-versa. Furthermore, the common endpoint may not have access to the directories that maintain the credentials. The entities may desire a common endpoint and login system where users from either entity can enter their existing credentials for authentication purposes, even if the credentials are associated with separate directories.

A common, global endpoint is described herein that addresses at least some of these issues. The global endpoint may be a computing system that hosts a page (e.g., a content page or network page, such as a web page) used to access an application or service via existing credentials. The global endpoint may be identified by an organization name and a location of the global endpoint (e.g., an Internet Protocol (IP) address) may be associated with a uniform resource locator (URL) that identifies the organization name (e.g., <organization name>.<application host>.com). The global endpoint may be associated with a plurality of directories, such as directories created by the entities that wish to provide their users with access to the application or service via the users' existing credentials.

The managed directory services may be distributed in different geographic regions. For example, one or more content delivery networks (CDNs) may be configured with a backend server, and the backend server may be in communication with systems that implement managed directory services. The systems that implement managed directory services may operate in a single region of a multi-region distributed computer system and may only communicate with other devices or systems in the single region. Thus, a CDN may be considered a regional endpoint and a system that implements a managed directory service may be considered a single endpoint. Using CDNs and distributing the managed directory services into various regions may provide some benefits, such as lower latency communications (e.g., via the caching of data) and improved resource balancing (e.g., by offloading computations from the single endpoints). However, in order to authenticate a user's credentials, the global endpoint may first have to identify the region in which a directory associated with the received credentials is located.

To help identify a region in which a directory is located, a route service (e.g., a domain name system (DNS) web service) can be maintained that includes a mapping of the organization name of a global endpoint with a DNS entry (e.g., a corresponding IP address). For example, the mapping may be stored in the route service when the global endpoint is created for an organization or a group of organizations. The route service may further include a mapping of the DNS entry with the address of one or more CDNs. Thus, the route service can be queried to identify a DNS entry associated with the organization name of the global endpoint and can be queried to identify the address of one or more CDNs associated with the DNS entry. The route service can then direct the global endpoint to the identified CDNs. One or more of the identified CDNs can direct the global endpoint to a regional service (e.g., a managed directory service) based on a stored mapping, and the regional service, based on the organization name, can identify the location of a directory.

For example, directories or other computing system entities within a region may have a unique identifier (e.g., a uniform resource identifier, a URL, or any other resource identifier) that is available to computing system entities within the region and/or unavailable to computing system entities outside the region. The unique identifier may be unavailable to computing system entities outside the region for security purposes (e.g., so that the specific location and type of directory for an entity remains hidden) and/or because the unique identifier could change. Because the unique identifier may be unavailable, the CDN or a regional service via the CDN may provide a different unique identifier that serves as an alias to the actual unique identifier of the directory to various computing systems in the distributed computing system, such as the global endpoint and the route service. Thus, if the global endpoint indicates a request to access a directory using the alias identifier, the route service can redirect the request to the appropriate CDN. The CDN may then identify a regional service that can determine the appropriate directory based on the contents of the alias identifier. Using such techniques to redirect calls or requests to the appropriate endpoint are described in more detail in U.S. patent application Ser. No. 14/098,446, entitled "TECHNIQUES FOR NETWORK REDIRECTION" and filed on Dec. 12, 2013, the contents of which are hereby incorporated by reference in their entirety.

Once the appropriate region is identified and the regional service points the global endpoint to the appropriate directory, the user's existing credentials can be authenticated by the appropriate directory. If authentication passes, the user may successfully log in and access the application or service. Thus, the user can access the application or service without having to create or use a new set of credentials separate from his or her existing credentials.

When a user logs in using his or her credentials to access the application or service, the URL bar in a browser application may remain static even as the route service redirects the user from the global endpoint to a CDN (at the request of the global endpoint) and the CDN identifies a regional service. For example, the user may visit the page identified by the organization name and the URL bar may display the organization name. Upon entering the organization name, the global endpoint may cause the browser application to be redirected to a login page generated by a regional service such that the user can enter his or her existing credentials and the URL bar may remain unchanged. Alternatively, the user may enter a URL that identifies the organization name and a service (e.g., <organization name>.<application host>.com/news-service, where news-service is the identified service). The URL bar may display the identified organization name and service, but the browser application may be redirected to the login page generated by the regional service. Once logged in, the user may be redirected to the home page of the application or service; yet the URL bar may still display the original URL.

Introduction—Managing a Directory Using an Organizational Name

Generally, as described above, a member server is used to manage resources of a directory. Some administrators, though, may not have access to a member server or may not wish to operate a member server (e.g., web developers, application developers, mobile application developers, etc.), and thus may not be able to perform any user management or otherwise manage the resources of a directory. For example, the global endpoint hosted by an application server may not be a member server and normally may not be used to manage or access the directory. However, the embodiments described herein also present a user management and authentication system that allows administrators to manage or access directories via computing systems, such as the global endpoint, by way of a set of application programming interfaces (APIs).

The user management and authentication system may be an add-on system that works in conjunction with the managed directory service to provide the functionality described herein. For example, the user management and authentication system may generate a set of login pages (e.g., content or network pages, such as web pages) that can be accessed by the global endpoint once the route service redirects the global endpoint to the correct CDN and the CDN resolves the region. An administrator can enter his or her credentials, a client identification that identifies an application or service that is requesting access to a domain, a redirect page (e.g., a page generated by the application or service that the administrator is trying to access via the global endpoint), and/or an organization name (e.g., a name that identifies the global endpoint, or the name of the directory). The user management and authentication system may transmit the credentials to the directory associated with the organization, and the directory may determine whether the credentials can be authenticated (e.g., whether the administrator has access to the directory). If the credentials can be authenticated, the user management and authentication system is notified and generates an authentication code (e.g., an OAuth code).

The authentication code may be transmitted by the user management and authentication system to the user device along with an instruction to access the redirect page. The authentication code may be a single-use code that is valid for a set period of time (e.g., 10 minutes, 1 hour, etc.) and, before expiration of the authentication code, may be used by the application or service associated with the redirect page to initiate access to the directory associated with the organization. For example, the user management and authentication system may include a getToken API. The application or service may call the getToken API, passing the authentication code as a parameter.

The getToken API may generate an access token and/or a refresh token in response to receiving a valid authentication code and provide the tokens to the application or service. The access token and/or the refresh token may be generated based on the credentials and/or the organization name. For example, the access token and/or the refresh token may include the credentials and/or the organization name in a secure format. The access token may allow the application or service to access and/or manage the directory associated with the organization via a set of APIs and may be valid for an administrator-defined or preset period of time (e.g., 1 hour, 1 day, etc.). The refresh token may be valid for an administrator-defined or preset period of time (e.g., 1 week, 1 month, etc.) and can be used by the application or service to receive a new access token once the previous access token expires. In some embodiments, the refresh token may be valid for no amount of time (e.g., the access token may not be refreshed once it expires).

In an embodiment, the user management and authentication system provides several APIs. Such APIs may include user APIs, group APIs, organizational unit APIs, password APIs, access token APIs, and/or service APIs. User APIs may include a createUser API (e.g., to create a user in a directory), a describeUsers API (e.g., to list all or any number of users within a directory and their attributes), an updateUser API (e.g., to update the attributes of a user in a directory), a deleteUser API (e.g., to delete a user from a directory), and/or a listGroupsForUser API (e.g., to list all or any number of users within a directory and their groups). Group APIs may include a createGroup API (e.g., to create a new group within a directory), a describeGroups API (e.g., to list groups and attributes of the groups within a directory), an updateGroup API (e.g., to update an existing group in a directory), a deleteGroup API (e.g., to delete a group from a directory), a listMembersInGroup API (e.g., to list the members of groups in the directory), an addMemberToGroup API (e.g., to add members (users or groups) to a group in a directory), and/or a removeMemberFromGroup API (e.g., to remove a member from a group in a directory). Organization unit APIs may include a describeOrganizationalUnits API (e.g., to list all or any number of organizational units within a directory and their attributes). Password APIs may include an authenticateUser API (e.g., to authenticate a user in the directory and return an authentication code), an authenticateKerberosUser API (e.g., to authenticate a user in the directory and return an authentication code), an authenticateRadiusUser API (e.g., to authenticate a user against a radius server associated with a directory and return an authentication code), a resetPassword API (e.g., to reset a user's password), and/or a changePassword API (e.g., to change a user's password). Access Token APIs may include a createAnonymousToken API (e.g., to create an anonymous token to store), a getToken API (e.g., to generate an access and/or refresh token based on an authentication code), a validateToken API (e.g., to verify that a previously issued access token or anonymous token is still valid), a refreshToken API (e.g., to generate a new access token using a previously issued refresh token), and/or a revokeToken API (e.g., to invalidate a previously issued access, anonymous, or refresh token). Service APIs may include a getServiceAccountCreds API (e.g., to allow a registered application or service to retrieve domain join credentials).

The application or service can use the access token to call any of the APIs supported by the user management and authentication system. For example, the access token and/or other operation-specific parameters can be provided to the user management and authentication system via an API to manage a directory. As described above, the access token may be generated based on the authentication code and/or the organization name. Thus, when unwrapped by the user management and authentication system upon reception via the API, the access token may identify the authentication code, and thus the administrator that is performing the action, and/or the directory that the action is to be performed on. Accordingly, the application or service may not separately identify the directory to be accessed and/or managed. Not separately identifying the directory may provide an additional level of security not found in conventional systems. In conventional systems, which generally involve accessing and managing a single directory, an administrator may manage the directory simply by providing a directory name and/or other operation-specific parameters. However, in the embodiments disclosed herein, a user or administrator may not be able to access and manipulate a directory in an unauthorized manner simply by providing an organization name and/or other operation-specific parameters. Rather, the access token is needed to access and/or manipulate a specific directory, and the user or administrator may obtain the access token only after his or her credentials can be verified with the specific directory (e.g., after the authentication code is received), as described herein.

In an embodiment, when generating the access token, the user management and authentication system may map the access token to a directory service token (e.g., a Kerberos token, other directory-specific credentials, etc.) that normally could be used by a member server to access the directory associated with the organization name. Thus, when an application or service calls an API using the access token, the user management and authentication system may access a database to determine the token that maps to the access token, and pass the mapped token (and/or other operation-specific parameters provided by the application or service) to the managed directory service to perform the action or operation requested via the calling of the API. In some embodiments, the validity of the refresh token may be tied to the validity of the mapped token (e.g., the lifetime of which can be preset or defined by an administrator). Results, if any, may be returned by the managed directory service to the user management and authentication system, and the user management and authentication system may forward the results to the application or service.

The application or service can repeat this process to generate access tokens for one or more directories operated by the administrator. Thus, the administrator, using an application or service, can access and/or manage a plurality of directories.

In further embodiments, the user management and authentication system supports single-factor authentication and/or multi-factor authentication (e.g., multiple, different sets of credentials may be provided by the user for authentication before access is granted). The user management and authentication system may support either type of authentication via user interfaces and/or APIs. The user management and authentication system may also support single sign-on (e.g., an administrator may be able to login once and gain access to all appropriate directories without being prompted to log in again each time a directory is accessed).

System Components

FIG. 1A illustrates a managed directory service environment with various regions that provide directory services according to one embodiment. The managed directory service environment shown in FIG. 1A includes various user devices 102, a route service 130, a third-party application servers 108, various CDNs 150A-B, various computing resource service provider systems 104A-C, and various scalable, private server systems 170. The various user devices 102, the route service 130, the third-party application servers 108, and the various CDNs 150A-B may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The computing resource service provider systems 104A-C and the various private server systems 170A-C may communicate with each other via separate communication networks 160A-C, respectively. The networks 160A-C may be private networks that have two endpoints: the computing resource service provider system 104A-C and the private server system 170A-C associated with the network 160A-C. The various private server systems 170A-C may not share networks 160A-C. Rather, each network 160A-C may be dedicated to a particular private server system 170A-C.

As will be appreciated by those of skill in the relevant art, the managed directory service environment may include any number of distinct user devices 102, computing resource service provider systems 104A-C, CDNs 150A-B, and/or private server systems 170A-C. The separate computing resource service provider systems 104A-C may be located so that they are close (in either a geographical or networking sense) to groups of current or potential user devices 102 or private server systems 170A-C.

In an embodiment, the managed directory services are distributed in different geographic regions 120A-B. For example, one or more CDNs 150A-B may be configured with a backend server, and the backend server may be in communication with systems that implement managed directory services, such as the computing resource service provider system 140A-C. The computing resource service provider systems 104A-C may operate in a single region of a multi-region distributed computer system and may only communicate with other devices or systems in the single region. Thus, a CDN 150A or 150B may be considered a regional endpoint and the computing resource service provider systems 140A-C may be considered a single endpoint.

The user devices 102 can include a wide variety of computing devices, including member servers, personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute an application to communicate via the network 110 with the computing resource service provider system 104 in order to manage one or more directories. For example, the application may be a stand-alone application that is installed on the user device 102. As another example, the application may be a browser (e.g., a web browser) that accesses an application or service (e.g., a web service) hosted by the computing resource service provider systems 104A-C, third-party application servers 108, and/or another computing system (not shown).

The third-party application servers 108 may be a computing system that hosts and provides access to applications or services (e.g., directory management services, document-sharing services, word processing applications, etc.). For example, the third-party application servers 108 may host various pages associated with different organization names that provide access to the hosted applications or services. The pages may have URLs in the following format: <organization name>.<application host>.com. Thus, the third-party application servers 108 may serve as a global endpoint for an administrator or user attempting to access a page associated with one or more entities. A single page hosted by the third-party application servers 108 may be associated with a plurality of directories, such as directories created by the entities that wish to provide their users with access to the application or service hosted by the third-party application servers 108 using the users' existing credentials. The third-party application servers 108 may be located in any region, such as the region 120A or the region 120B.

The user devices 102 may access the hosted applications or services via the network 110. The applications or services may be affiliated with an entity that operates the computing resource service provider system 104 or may be operated by third-party entities. In an embodiment, applications or services provided by the third-party application servers 108 or the computing resource service provider system 104 that have registered with the computing resource service provider system 104 may access the features described herein. Applications or services that have not registered with the computing resource service provider system 104 and/or that have not been approved by administrators of the computing resource service provider system 104 may be barred from accessing the features described herein.

The private server systems 170A-C may store a directory associated with an entity. For example, the private server systems 170A-C may store an on-premises directory for an organization. In some embodiments, the private server systems 170A-C can store multiple directories for the same entity. The directories may be managed by the respective computing resource service provider system 104A-C, as described in greater detail below with respect to FIG. 1B.

The route service 130 may help identify a CDN 150A-B that can help identify a region in which a directory is located.

The route service 130 (e.g., a domain name system (DNS) web service) can include a mapping of an organization name created by the applications server 140 with a DNS entry (e.g., a corresponding IP address). For example, the mapping may be stored in the route service 130 when the organization name is created for an organization (e.g., a plurality of entities). The route service 130 may further include a mapping of the DNS entry with the address of one or more CDNs 150A-B. Thus, the route service 130 can be queried to identify a DNS entry associated with the organization name and can be queried to identify the address of one or more CDNs 150A-B associated with the DNS entry. The route server 130 can then direct the application executed on the user device 102 (e.g., the browser) to the identified CDNs 150A-B. One of the identified CDNs 150A-B can direct the user device 102 to a regional service (e.g., a computing resource service provider system 104A-C) based on a stored mapping, and the regional service, based on the organization name, can identify the location of a directory.

For example, directories or other computing system entities within the region 120A may have a unique identifier (e.g., a uniform resource identifier, a URL, or any other resource identifier) that is available to computing system entities within the region 120A and/or unavailable to computing system entities outside the region 120A. As described above, the unique identifier may be unavailable to computing system entities outside the region 120A for security purposes (e.g., so that the specific location and type of directory for an entity remains hidden) and/or because the unique identifier could change. Because the unique identifier may be unavailable, the CDN 150A or the computing resource service provider system 104A via the CDN 150A may provide a different unique identifier that serves as an alias to the actual unique identifier of the directory to various computing systems in the distributed computing system, such as the applications server 140 and the route service 130. Thus, if the application server 140 generates a request to access a directory using the alias identifier, the route service 130 can redirect the request to the appropriate CDN 150A or 150B. The CDN 150A or 150B may then identify a computing resource service provider system 104A-C that can determine the appropriate directory based on the contents of the alias identifier.

Example Network Environment

Figure 1B:
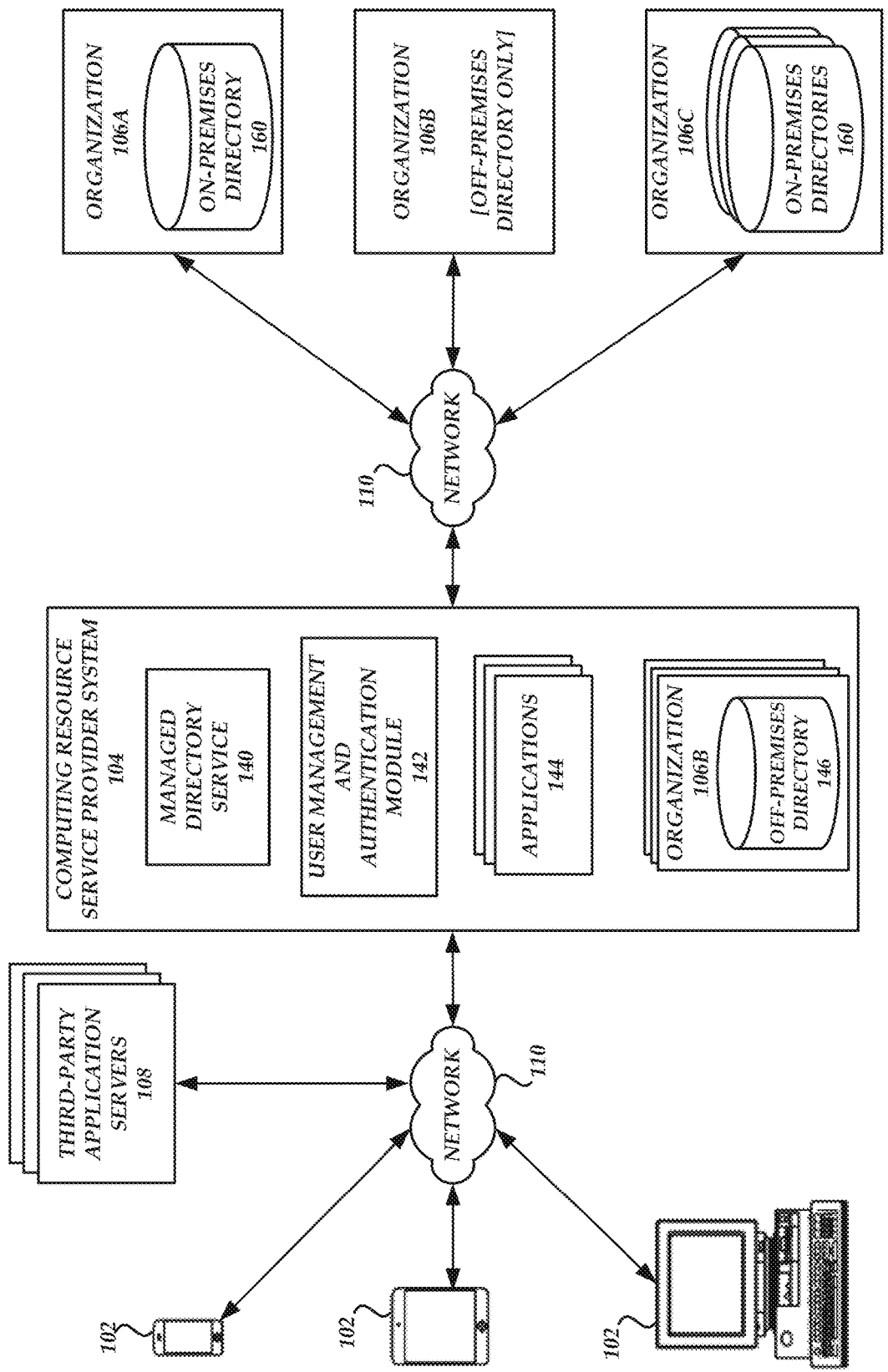
FIG. 1B shows an example network environment in which directory management features and user, group, and device management and authentication features of the present disclosure can be implemented according to some embodiments.

FIG. 1B shows an example network environment in which directory management features and user, group, and device management and authentication features of the present disclosure can be implemented according to some embodiments. The network environment shown in FIG. 1B includes components for one region for the purposes of simplicity. As used herein the term "directory" generally refers to an organized collection of data about users, devices, applications, and other common resources of a computer network. Each resource on a computer network (or some subset thereof) may be represented as an object in a directory, and information about a particular resource (e.g., name, address, permissions, etc.) can be stored as attributes of that object. Information can be securely stored within or in association with the object such that only users with sufficient permissions are able to access, modify, or otherwise use the information.

As shown, the network environment includes various user devices 102, a computing resource service provider system 104, organizations 106 and third-party application servers 108 in communication via one or more networks 110. The computing resource service provider system 104 can provide applications; directory management services; user, group, and device management and authentication services; and/or other network-based services to various organizations or other customers. Organizations 106A-C (or other customers) can employ the computing resource service provider system 104 to provide application access to users associated with the organizations, manage the organizations' directories, etc. Individual users can use user devices 102 to access applications hosted by the computing resource service provider system 104 (or third-party application servers 108) using credentials from their respective organizations 106A-106C. In addition, the computing resource service provider system 104 can provide the applications with access to the directories of the various organizations 106A-C at the discretion of the respective organizations.

Some user devices 102 may be associated with a particular organization 106A-C. For example, an organization may have various user devices 102 that remain on-premises, or that are used off-premises primarily by employees, administrators, or other users associated with the organization. In some embodiments, some or all of the user devices 102 may be separate from any organization, such as public computers or home computers that are used by any number of users to perform various tasks, which may include managing directories or accessing applications using credentials associated with a particular organization 106A-C or other customer of the computing resource service provider system 104.

The computing resource service provider system 104 can be a computing system configured to host or otherwise provide access to applications 144 (word processing applications, photo-editing applications, electronic mail applications, etc.), manage directories for separate customer organizations 106A-C, and/or provide other network-based services and resources (e.g., document-sharing services, virtual machine services, etc.). For example, the computing resource service provider system 104 can be a server or group of servers that may be accessed via a communication network 110. The computing resource service provider system 104 can include a number of components to provide various features described herein, such as a managed directory system or service 140, a user management and authentication module 142, and one or more applications or application servers 144 that can be accessed by organizations 106 and user devices 102. The computing resource service provider system 104 may also store various off-premises directories 146, such as an off-premises directory for organization 160B, as described below. In some embodiments, the computing resource service provider system 104 may include additional or fewer components than illustrated in FIG. 1 to provide the features described above and in greater detail below.

As used herein, the term "off-premises directory" refers to a directory that is remote from the organization with which it is associated, in order to distinguish such a directory from a directory that is located on an organization's premises. Thus, although a directory may be physically stored on the premises of a computing resource service provider system 104, the directory may nevertheless be referred to as an off-premises directory because it is off-premises with respect to the organization with to which it belongs (e.g., the organization that owns or operates the network described by the directory). Additionally, although a directory may be physically stored off the premises of the computing resource service provider system 104, the directory may nevertheless be referred to as an on-premises directory because it is on-premises with respect to the organization to which it belongs.

Illustratively, an administrator may use the application executed by the user device 102 to manage one or more directories owned or operated by the administrator's organization, such as one of organizations 106A-C. The application may interact with the managed directory service 140 and/or the user management and authentication module 142. The managed directory service 140 may be a computing system that implements a managed directory service. In an embodiment, the managed directory service 140 is configured to create, monitor, and manage one or more directories. For example, the managed directory service 140 may be in communication with and manage the off-premises directory 146 and/or the on-premises directories 160. As described above, an administrator may use the managed directory service 140 to create, monitor, and/or manage a directory if the user device 102 is a member server. However, if the user device 102 is not a member server, the administrator may create, monitor, and/or manage the directory via APIs provided by the user management and authentication module 142.

The user management and authentication module 142 may be a computing system that implements a user, group, and device management and authentication system. In an embodiment, the user management and authentication module 142 allows administrators to manage one or more directories with user devices 102 that are not member servers (e.g., that are not associated with a domain of the respective directory) via a set of APIs, such as the APIs described above. The user management and authentication module 142 may also provide authorization and authentication mechanisms for allowing the application executed by the user device 102 or applications or services accessed by the executed application to access content or resources in a directory even if the executed application or the accessed applications or services do not have direct access to a list of created users of the directory. For example, the user management and authentication module 142 may be in communication with the managed directory service 140 and may serve as an interface between the user device 102 and the managed directory service 140 such that the user device 102 can manage one or more directories managed by the managed directory service 140. The user device 102 can call an API provided by the user management and authentication module 142, and the user management and authentication module 142 can instruct the managed directory service 140 to perform an action indicated by the called API. The interaction between the user device 102, the managed directory service 140, and the user management and authentication module 142 is described in greater detail below with respect to FIGS. 2A-2B.

In further embodiments, the user management and authentication module 142 supports single-factor authentication and/or multi-factor authentication. The user management and authentication module 142 may support either type of authentication via user interfaces and/or APIs. The user management and authentication module 142 may also support single sign-on (e.g., an administrator may be able to login once and gain access to all appropriate directories without being prompted to log in again each time a directory is accessed).

The computing resource service provider system 104 may be a single computing device, or it may include multiple distinct computing devices, such as computer servers, logically or physically grouped together to collectively operate as a server system. The components of the computing resource service provider system 104 can each be implemented in application-specific hardware (e.g., a server computing device with one or more ASICs) such that no software is necessary, or as a combination of hardware and software. In addition, the modules and components of the computing resource service provider system 104 can be combined on one server computing device or separated individually or into groups on several server computing devices.

In addition, multiple (e.g., two or more) computing resource service provider systems 104 may be used. For example, computing resource service provider systems 104 may be located in separate regions and may or may not interact with each other. The separate computing resource service provider systems 104 may be located so that they are close (in either a geographical or networking sense) to groups of current or potential user devices 102 or organizations 160A-C.

In some embodiments, the features and services provided by the computing resource service provider system 104 may be implemented as web services consumable via the communication network 110. In further embodiments, the computing resource service provider system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The organizations 106A-C can correspond to various customers of the computing resource service provider system 104. Although the term "organization" is used herein, the features involving such organizations may additionally or alternatively involve any customer having a directory (whether on-premises or off-premises) and wishing to use the computing resource service provider system 104 to manage the directory and control access to the directory by applications hosted by the computing resource service provider 104 or third-party application servers 108.

Organizations that maintain on-premises directories 160 may have one or more servers on which the directories 160 are stored. For example, organization 106A may have a data center that includes various servers, and an on-premises directory 160 may be stored on one or more of the servers. Organizations that maintain off-premises directories may employ the services of the computing resource service provider system 104, which may store the off-premises directory in an off-premises directory data store 146. For example, organization 106B may not maintain an on-premises directory at all, but may rely instead on the computing resource service provider system 104 to maintain the organization's directory 146. Some organizations may choose to maintain multiple directories on-premises and/or off-premises. For example, organization 106C may store multiple on-premises directories 160, each in a manner similar to organization 106A (described above), and the organization 106C may also choose to employ the computing resource service provider system 104 to maintain an off-premises directory 146. The directory 146 maintained by the computing resource service provider system 104 in this example may be a mirror or subset of the on-premises directory (e.g. for backup or disaster-recovery purposes), or it may be a separate directory altogether (e.g., a directory of computing resources in a different region from the on-premises directory 160).

The communication network 110 may be a publicly accessible network of linked networks, possibly operated by various distinct parties, such as the Internet. In some embodiments, the communication network 110 may be or include the Internet, a private network, personal area network, local area network, wide area network, cable network, satellite network, cellular telephone network, etc. or combination thereof.

Example Interactions to and from the User Management and Authentication Module

Figure 2A:
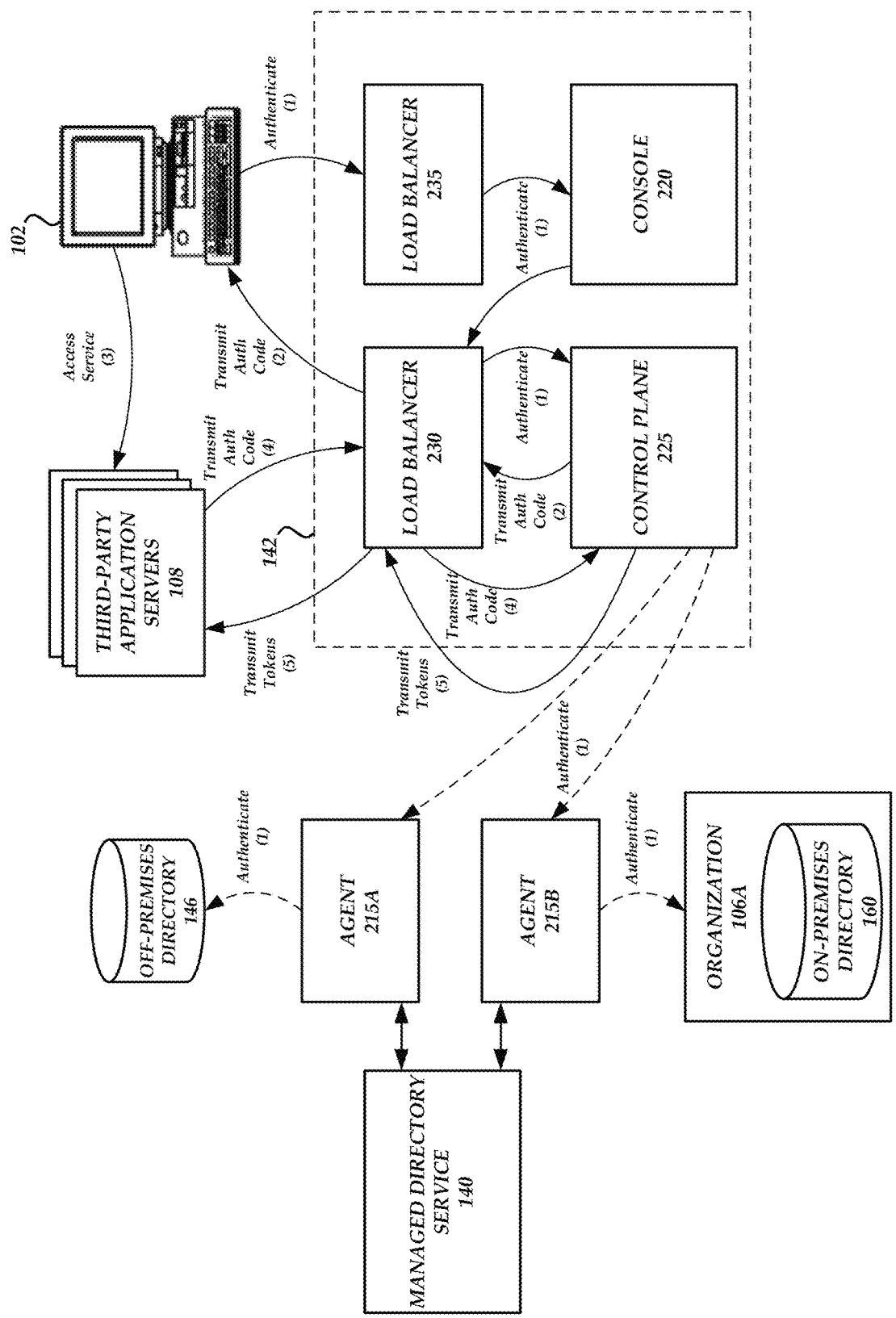
FIG. 2A shows interactions to and from the user management and authentication module 142 during the process of providing a service accessed by a user device with tokens.

FIG. 2A shows interactions to and from the user management and authentication module 142 during the process of providing a service accessed by a user device with tokens. As illustrated in FIG. 2A, the directory service module 140 may interact with a plurality of agents 215A-B, and the agents 215A-B may interact with the user management and authentication module 142.

In an embodiment, each agent 215A-B is associated with one or more separate directories and directly interfaces with its associated directories for management purposes. The agents 215A-B may be associated with and communicate with on-premises and/or off-premises directories. For example, the agent 215A may be associated with the off-premises directory 146 and the agent 215B may be associated with the on-premises directory 160. The managed directory service 140 may be configured to create, monitor, and/or manage the agents 215A-B. While two agents 215A-B are illustrated, this is not meant to be limiting. The computing resource service provider system 104 may include any number of agents (e.g., a number of agents sufficient to handle all directories managed by the managed directory service 140).

The agents 215A-B may receive translated versions of API calls made to the user management and authentication module 142. The translated versions of the API calls made to the user management and authentication module 142 may be directory-specific API calls (e.g., LDAP, Kerberos, DNS, etc.) that can be executed by the managed directory service 140. As an example, translation of the API calls may include mapping an access token to a directory service token (e.g., a Kerberos token, a username and password pair, an NT LAN manager (NTLM) hash, etc.).

In an embodiment, the user management and authentication module 142 includes a console 220, a control plane 225, and load balancers 230 and 235. The console 220 may be configured to generate user interfaces that are transmitted to the user devices 102. The user interfaces may be login pages that may be transmitted to a user device 102 when a user device 102 calls an API provided by the user management and authentication module 142 to login, reset a password, change a password, and/or perform other operations described herein. The console 220 may also generate a link (e.g., a uniform resource locator (URL)) that can be transmitted to the user device 102, such as, for example, when a new user is created. The link may be valid for a finite period of time (e.g., 7 days, 2 weeks, etc.) and, when selected, may redirect the application executed by the user device 102 to a content page that allows the administrator to enter additional information, such as user profile information. The console 220 may also transmit an electronic message (e.g., email, text message, etc.) that includes the link to an account associated with an administrator when a user device 102 calls an API provided by the user management and authentication module 142 to reset a password. The electronic message may include a one-time user token that can be used by the user device 102 to complete the password reset process.

The control plane 225 may be configured to expose APIs to the user devices 102. For example, the control plane 225 may expose APIs like the APIs described herein. The control plane 225 may also be configured to interact with the agents 215A-B. For example, the control plane 225 may translate the API calls received from the user devices 102 into directory-specific API calls that can be executed by the managed directory service 140 and provide the directory-specific API calls to the appropriate agent 215A-B (e.g., the agent associated with the directory on which an action is to be performed according to the API call). The control plane 225 is described in greater detail below with respect to FIG. 2B.

The console 220 and the control plane 225 may each be behind a load balancer 230 or 235. The console 220 and the control plane 225 may each include multiple computing resources and the load balancers 230 and 235 may distribute workloads across the multiple computing resources to optimize resource use, to maximize throughput, and/or to minimize the risk that any single resources becomes overloaded. For example, the load balancers 230 and 235 may receive API calls from the user device 102 and distribute the API calls to the appropriate computing resources of the console 220 or the control plane 225.

At (1), an administrator, via the user device 102, may first communicate with the load balancer 235 to authenticate his or her credentials. The load balancer 235 may forward the authentication request and credentials to the console 220, which may forward the authentication request and credentials to the load balancer 230. The load balancer 230 may forward the authentication request and credentials to the control plane 225. The control plane 225 may determine a directory associated with the credentials and transmit the authentication request and credentials to the appropriate agent 215A or 215B. Once the appropriate agent 215A or 215B receives the authentication request and credentials, the agent 215A or 215B may perform the authentication by contacting its associated directory (e.g., off-premises directory 146 or on-premises directory 160).

At (2), in response to a determination that the administrator's credentials can be authenticated, the control plane 225 generates an authentication code. The control plane 225 transmits the authentication code to the load balancer 230 for forwarding to the user device 102.

At (3), the user device 102 accesses a service provided by the third-party application servers 108. In alternative embodiments, not shown, the user device 102 accesses an application in the applications 144 provided by the computer resource service provider system 104.

At (4), the accessed service transmits the authentication code to the load balancer 230 for the purpose of receiving an access token and/or a refresh token. The load balancer 230 may forward the authentication code to the control plane 225.

At (5), the control plane 225 generates the access token and/or the refresh token based on the received authentication code. The control plane 225 may generate the access token if the authentication code is received before expiration. The control plane 225 may transmit the access token and/or the refresh token to the load balancer 230 for forwarding to the accessed service.

Figure 2B:
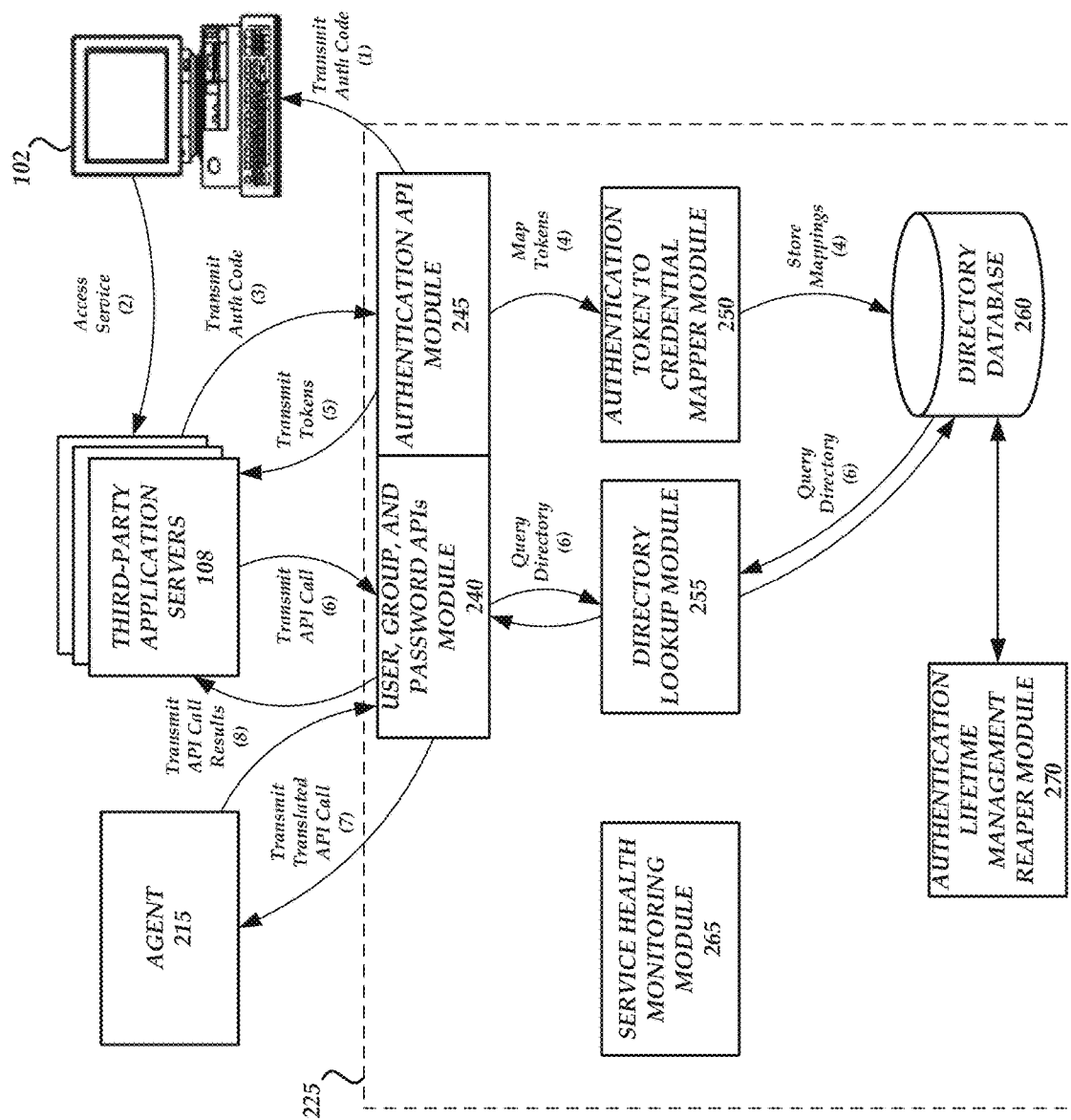
FIG. 2B shows interactions to and from the user management and authentication module 142 during the process of providing tokens and handling API calls.

FIG. 2B shows interactions to and from the user management and authentication module 142 during the process of providing tokens and handling API calls. As illustrated in FIG. 2B, the control plane 225 may include a user, group, and password APIs module 240, an authentication API module 245, an authentication token to credential mapper module 250, a directory lookup module 255, a directory database 260, a service health monitoring module 265, and an authentication lifetime management reaper module 270.

In alternate embodiments, not shown, the directory lookup module 255 is a component of an agent 215A or 215B.

The authentication API module 245 may generate an authentication code, a refresh token, and/or an access token. For example, the authentication API module 245 may receive administrator credentials, a client identification that identifies an application or service hosted by the applications server 140 that is requesting access to a domain, a redirect page (e.g., a page associated with an application or service that the user management and authentication module 150 should instruct the user device 102 to access once authentication is complete), and/or an organization name or identifier (e.g., an identifier that identifies the global endpoint or a directory identifier). The authentication API module 245 may transmit the credentials to the agent 215A or 215B that corresponds with a directory associated with the organization name. The agent 215A or 215B may pass the credentials to the directory service module 140 to determine whether the credentials can be authenticated (e.g., whether the administrator has access to the directory). If the credentials can be authenticated, the authentication API module 245 is notified and generates an authentication code (e.g., an OAuth code).

At (1), as described above, the authentication code may be a single-use code that is valid for a finite period of time (e.g., 10 minutes, 1 hour, etc.). The authentication API module 245 may transmit the authentication code to the user device 102. The authentication API module 245 may also transmit to the user device 102 an instruction to access the redirect page.

At (2), the user device 102 accesses a service provided by the third-party application servers 108. In alternative embodiments, not shown, the user device 102 accesses an application in the applications 144 provided by the computer resource service provider system 104.

At (3), the authentication API module 245 receives the authentication code from the accessed service (e.g., accessed via a browser). For example, the authentication API module 245 may receive the authentication code if the getToken API is called (e.g., the authentication code may be included as parameter).

If an unexpired authentication code is received, the authentication API module 245 may generate an access token and/or a refresh token. The access token and/or the refresh token may be generated based on the credentials and/or the organization name. For example, when unwrapped, the access token and/or the refresh token may indicate the authentication code (and thus the credentials and administrator associated with the credentials) and the organization name associated with the token. The access token may allow the accessed service to manage the directory associated with the organization name via a set of APIs provided by the user, group, and password APIs module 240. The access token may be valid for an administrator-defined or finite period of time (e.g., 1 hour, 1 day, etc.). The refresh token may be valid for an administrator-defined or finite period of time (e.g., 1 week, 1 month, etc.) and can be used by the user device 102 and/or the accessed application or service to receive a new access token once the previous access token expires. In some embodiments, the refresh token may not be valid for any period of time (e.g., the access token may not be refreshed once it expires.

At (4), in some embodiments, the authentication API module 245 transmits the access token, the refresh token, the credentials, and/or the directory identifier to the authentication token to credential mapper module 250. The authentication token to credential mapper module 250 may use underlying directory logic to map the credentials and/or the organization name (or an identifier of a directory associated with one of the entities of the organization) to the access token and/or the refresh token and store this mapping in the directory database 260.

At (5), the authentication API module 245 may also transmit the access token and/or the refresh token to the accessed service. The user, group, and password APIs module 240 may provide one or more of the APIs described above, and the accessed service may use the access token and/or other operation-specific parameters to call one or more of the provided APIs. In some embodiments, not shown, the authentication API module 245 transmits the access and/or refresh tokens to the accessed service before performing the operations discussed with respect to (4).

At (6), in an embodiment, upon receiving an API call that includes an access token from a calling service, the user, group, and password APIs module 240 identifies a directory associated with the access token by querying the directory lookup module 255. For example, the directory lookup module 255 may pass the access token to the directory database 260 and identify a directory associated with the access token, transmitting the identified directory back to the user, group, and password APIs module 240.

At (7), the user, group, and password APIs module 240 may then identify an agent 215A or 215B associated with the identified directory, translate the API call into a directory-specific API call, and pass the directory-specific API call and its operation-specific parameters to the appropriate agent 215A or 215B. The user, group, and password APIs module 240 may determine how to translate the API call into a directory-specific API call based on information provided by the directory lookup module 255. In alternate embodiments, not shown, the user, group, and password APIs module 240 directly identifies a directory associated with the access token without querying the directory lookup module 255 (e.g., via an internal lookup table or database).

As described above, the agents 215A-B may receive directory-specific API calls translated from API calls received by the user, group, and password APIs module 240. As an example, the user, group, and password APIs module 240 may map the access token received by the user, group, and password APIs module 240 to a directory service token (e.g., a Kerberos token), and the directory service token may be provided to the agents 215A-B to access the appropriate directory.

At (8), results, if any, may be received by the agents 215A-B from the managed directory service 140 and forwarded to the user, group, and password APIs module 240. The user, group, and password APIs module 240 may then transmit the results to the calling service.

The service health monitoring module 265 may be a computing system that monitors the health of a directory service. For example, the service health monitoring module 265 may monitor the health of the directory service module 140.

The authentication lifetime management reaper module 270 may perform maintenance on the directory database 260. For example, the authentication lifetime management reaper module 270 may reap out or remove access tokens and/or refresh tokens that have expired (and their associated credentials and directory identification).

Figure 3:
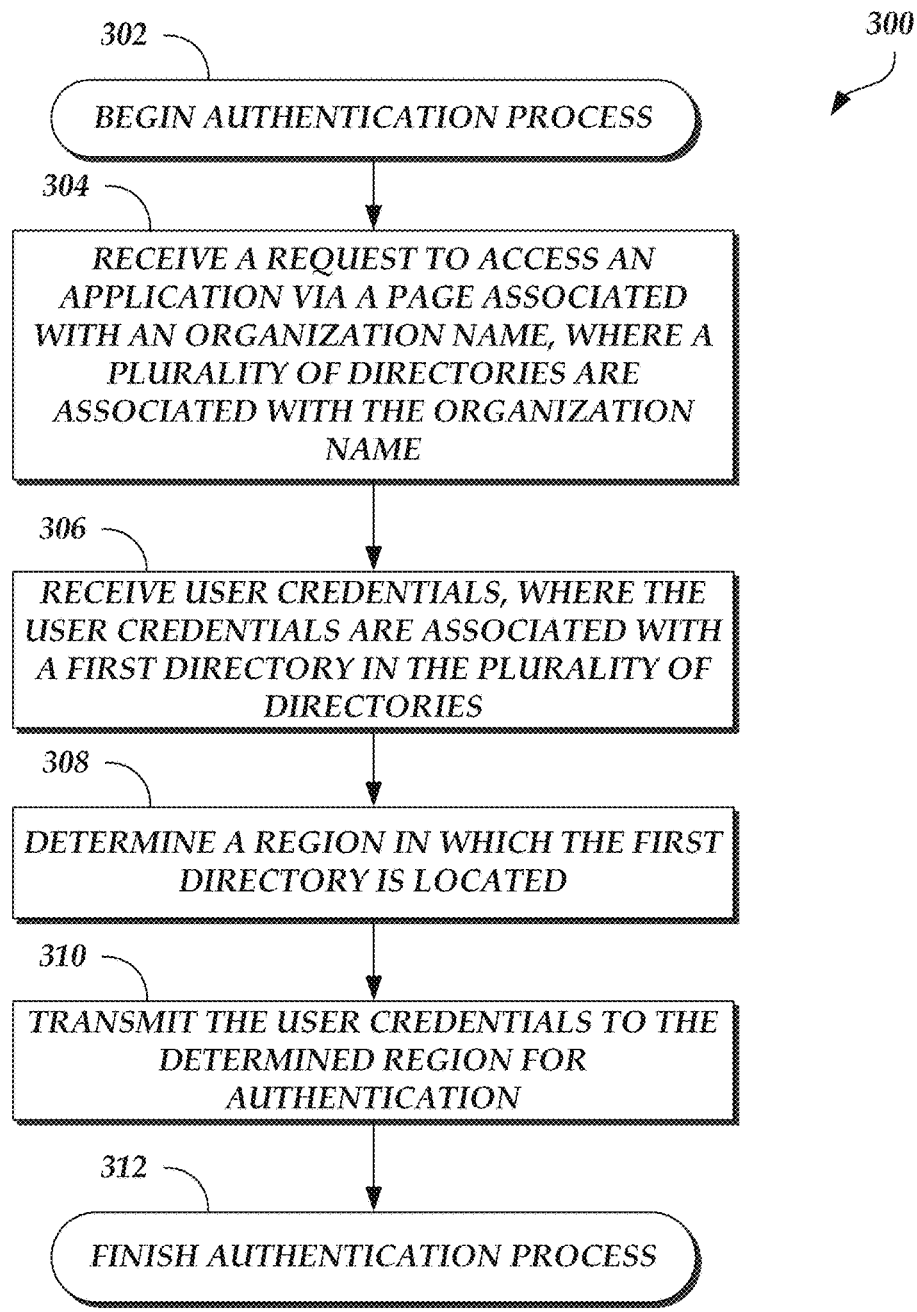
FIG. 3 illustrates a process for authenticating a user at a common endpoint associated with a plurality of directories in different regions that may be used by a third-party application server or applications or services provided by a computer resource service provider system.

Example Process for Authenticating a User at a Common Endpoint Associated with Different Directories in Different Regions FIG. 3 illustrates a process 300 for authenticating a user at a common endpoint associated with a plurality of directories in different regions that may be used by a third-party application server or applications or services provided by a computer resource service provider system. As an example, the third-party application server 108 or the computer resource service provider system 104 of FIGS. 1A-1B can be configured to execute the authentication process 300. The authentication process 300 begins at block 302.

At block 304, a request to access an application via a page associated with an organization name is received. For example, the organization name may identify a global endpoint. A plurality of directories may be associated with the organization name. For example, the organization name may be associated with a plurality of entities. Each entity may store and maintain a separate directory. In an embodiment, one or more of the directories in the plurality are located in separate regions. Computing devices in each individual region may not communicate with computing devices in the other regions.

At block 306, user credentials are received. The user credentials may be associated with a first directory in the plurality of directories. For example, the user associated with the user credentials may be an employee of an entity that stores and maintains the first directory.

At block 308, a region in which the first directory is located is determined. In an embodiment, a route service, such as the route service 130, includes a mapping of a DNS entry to the page associated with the organization name. The route service may also include a mapping of DNS entries to CDN entries. A CDN may include a mapping to various regional services. For example, the first directory may be identified with an alias identifier provided by a CDN or a regional service via the CDN to the route service and/or the computing resource service provider system or third-party application servers. Upon receiving the alias identifier from the computing resource service provider system or third-party application servers, the route service may be able to redirect a user device to the appropriate CDN. The CDN may identify a regional service that manages the first directory, thereby identifying the region of the first directory (e.g., the regional service is in the same region as the first directory).

At block 310, the user credentials are transmitted to the determined region for authentication. After the user credentials are transmitted to the determined region, the authentication process 300 may be complete, as shown in block 312.

Example User Interface for Accessing a Global Endpoint

Figure 4A:
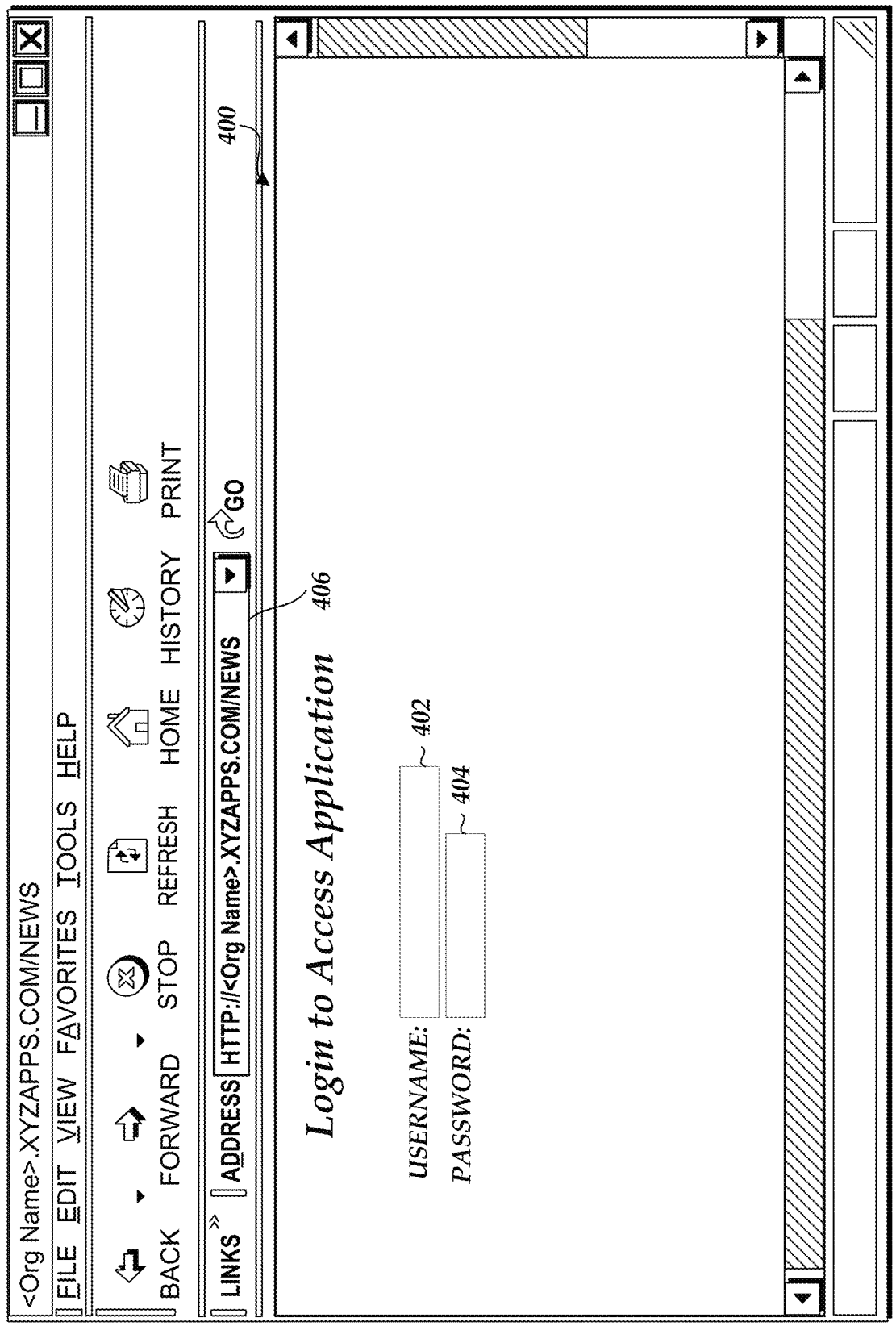
FIGS. 4A-B illustrate an example of a representation of a network page viewed on a user device, such as the user device of FIGS. 1A-1B.
Figure 4B:
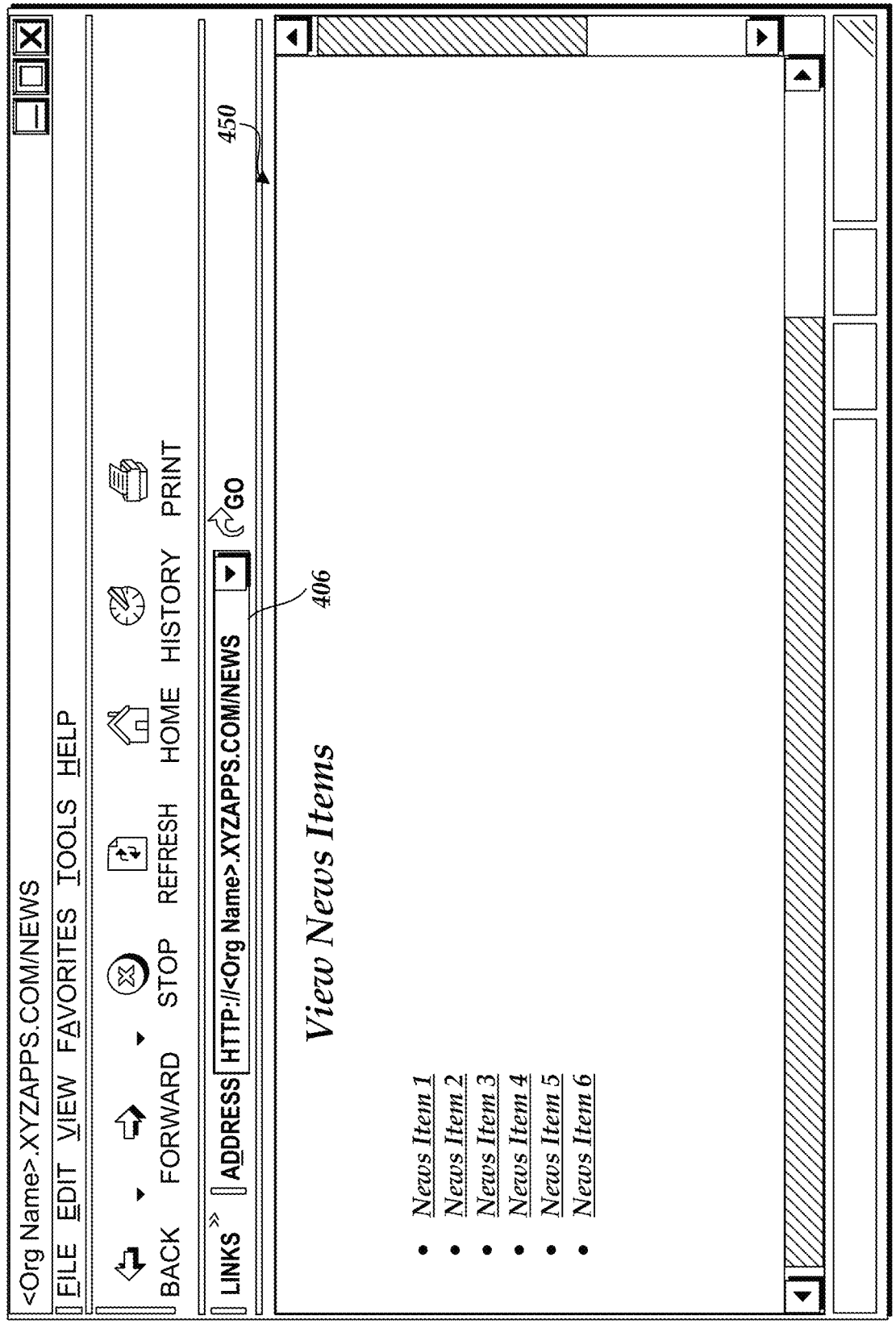

FIGS. 4A-B illustrate an example of a representation of a network page 400 viewed on a user device, such as the user device 102. The network page 400 may be generated by a regional service, such as the computing resource service provider system 104, and displayed within the user interface of a browser application executed by the user device 102. As illustrated in FIG. 4A, the network page 400 allows a user to enter credentials (e.g., a username and password) to access an application. For example, the user can enter a username in field 402 and a password in field 404.

A URL bar 406 indicates a URL provided by the user. In an embodiment, the URL remains static through the login process. For example, the user may have provided the URL <Org Name>.XYZAPPS.COM/NEWS in order to access a news service hosted by a first computing resource service provider system 104 or the third-party application servers 108. However, because the user has not yet logged in, the first computing resource service provider system 104 or the third-party application servers 108 redirects the user to the login page represented by the network page 400. The login page represented by the network page 400 may be generated by a computing resource service provider system 104 that is different than the first computing resource service provider system 104 or the third-party application servers 108, such as the computing resource service provider system 104 that is associated with the directory corresponding to the user's organization. The computing resource service provider systems 104 and the third-party application servers 108 may be located in different regions. Thus, the browser application may have been redirected from a page generated by a host in one region to another page generated by another host in another region to complete the login process. The browser application may have been so redirected based on the mappings stored in the route service 130 and based on the mappings stored in the CDN 150A or 150B. The URL bar 406, though, may still display the URL <Org Name>.XYZAPPS.COM/NEWS.

As illustrated in FIG. 4B, the user has successfully logged in and a news service generated by the first computing resource service provider system 104 or the third-party application servers 108 is displayed in network page 450. However, the URL bar 406 again displays the same URL even though the user was redirected from the network page 400 to the network page 450, and thus redirected from a host located in one region to another host located in another region.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

a route service; and a computing resource service provider system comprising one or more computing devices, the computing resource service provider system associated with a region, the computing resource service provider system configured with computer-executable instructions that, when executed, cause the computing resource service provider system to:

obtain a uniform resource location (URL) provided by a user device that identifies a service hosted by the computing resource service provider system;

redirect the user device to a login page generated by a second computing resource service provider system based on information provided by the route service, wherein a user interface depicting the login page displays the URL provided by the user device, and wherein the second computing resource service provider system is configured to pass login information entered in the user interface to a directory in a same region as the second computing resource service provider system using an identifier unavailable to the computing resource service provider system; and redirect the user device from the login page to a second page displaying the service hosted by the computing resource service provider system in response to a login being successful, wherein a user interface depicting the second page displays the URL provided by the user device.

2. The system of claim 1, wherein the second computing resource service provider system is associated with a directory corresponding to an organization of a user operating the user device.

3. The system of claim 1, wherein the computing resource service provider system is located in a first region, and the second computing resource service provider system is located in a second region different than the first region.

4. The system of claim 1, wherein the URL comprises at least one of a name of an organization of a user operating the user device or the service hosted by the computing resource service provider system.

5. The system of claim 1, wherein a browser application of the user device displays the user interface depicting the login page and the user interface depicting the second page, and wherein a URL bar of the browser application remains static whether the user interface depicts the login page or the second page.

6. The system of claim 1, wherein the route service includes a first mapping of an organization name with a domain name system (DNS) entry and a second mapping of the DNS entry with an address of a content delivery network (CDN), wherein the computer-executable instructions that, when executed, further cause the computing resource service provider system to redirect the user device to the login page based on at least one of the first mapping or the second mapping.

7. The system of claim 1, wherein the service hosted by the computing resource service provider system is a news service.

8. A computer-implemented method,
as implemented by a computing resource service provider system comprising one or more computing devices, the computing resource service provider system configured with specific executable instructions, the computer-implemented method comprising:
obtaining a uniform resource location (URL) provided by a user device that identifies a service hosted by the computing resource service provider system;
redirecting the user device to a login page generated by a second computing resource service provider system, wherein a user interface depicting the login page displays the URL provided by the user device, and wherein the second computing resource service provider system is configured to pass login information entered in the user interface to a directory in a same region as the second computing resource service provider system using an identifier unavailable to the computing resource service provider system; and
redirecting the user device from the login page to a second page displaying the service hosted by the computing resource service provider system in response to a login being successful, wherein a user interface depicting the second page displays the URL provided by the user device.

9. The computer-implemented method of claim 8, wherein the second computing resource service provider system is associated with a directory corresponding to an organization of a user operating the user device.

10. The computer-implemented method of claim 8, wherein the computing resource service provider system is located in a first region, and the second computing resource service provider system is located in a second region different than the first region.

11. The computer-implemented method of claim 8, wherein the URL comprises at least one of a name of an organization of a user operating the user device or the service hosted by the computing resource service provider system.

12. The computer-implemented method of claim 8, wherein a browser application of the user device displays the user interface depicting the login page and the user interface depicting the second page, and wherein a URL bar of the browser application remains static whether the user interface depicts the login page or the second page.

13. The computer-implemented method of claim 8, wherein a route service includes a first mapping of an organization name with a domain name system (DNS) entry and a second mapping of the DNS entry with an address of a content delivery network (CDN), and wherein redirecting the user device to the login page further comprises redirecting the user device to the login page based on at least one of the first mapping or the second mapping.

14. The computer-implemented method of claim 8, wherein the service hosted by the computing resource service provider system is a news service.

15. A non-transitory computer storage system comprising a non-transitory storage device, said computer storage system having stored thereon executable program instructions that direct a computing resource service provider system to at least:
obtain a uniform resource location (URL) provided by a user device that identifies a service hosted by the computing resource service provider system;
redirect the user device to a login page generated by a second computing resource service provider system, wherein a user interface depicting the login page displays the URL provided by the user device, and wherein the second computing resource service provider system is configured to pass login information entered in the user interface to a directory in a same region as the second computing resource service provider system using an identifier unavailable to the computing resource service provider system; and
redirect the user device from the login page to a second page displaying the service hosted by the computing resource service provider system in response to a login being successful, wherein a user interface depicting the second page displays the URL provided by the user device.

16. The non-transitory computer storage system of claim 15, wherein the second computing resource service provider system is associated with a directory corresponding to an organization of a user operating the user device.

17. The non-transitory computer storage system of claim 15, wherein the computing resource service provider system is located in a first region, and the second computing resource service provider system is located in a second region different than the first region.

18. The non-transitory computer storage system of claim 15, wherein the URL comprises at least one of a name of an organization of a user operating the user device or the service hosted by the computing resource service provider system.

19. The non-transitory computer storage system of claim 15, wherein a browser application of the user device displays the user interface depicting the login page and the user interface depicting the second page, and wherein a URL bar of the browser application remains static whether the user interface depicts the login page or the second page.

20. The non-transitory computer storage system of claim 15, wherein a route service includes a first mapping of an organization name with a domain name system (DNS) entry and a second mapping of the DNS entry with an address of a content delivery network (CDN), and wherein the executable program instructions further direct the computing resource service provider system to at least redirect the user device to the login page based on at least one of the first mapping or the second mapping.

\* \* \* \* \*